(12) United States Patent
Suffield et al.

(10) Patent No.: US 10,071,642 B2
(45) Date of Patent: Sep. 11, 2018

(54) CONTROL SYSTEM, VEHICLE AND METHOD

(71) Applicant: Jaguar Land Rover Limited, Coventry (GB)

(72) Inventors: Iain Suffield, Coventry (GB); Katy Holloway, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/784,252

(22) PCT Filed: Apr. 24, 2014

(86) PCT No.: PCT/EP2014/058328
§ 371 (c)(1),
(2) Date: Oct. 13, 2015

(87) PCT Pub. No.: WO2014/174004
PCT Pub. Date: Oct. 30, 2014

(65) Prior Publication Data
US 2016/0059721 A1    Mar. 3, 2016

(30) Foreign Application Priority Data

Apr. 26, 2013   (GB) .................................. 1307526.2
May 1, 2013    (GB) .................................. 1307863.9

(51) Int. Cl.
*B60L 11/18*     (2006.01)
*B60L 3/00*      (2006.01)
(Continued)

(52) U.S. Cl.
CPC ............. *B60L 11/1824* (2013.01); *B60L 3/00* (2013.01); *B60L 11/14* (2013.01);
(Continued)

(58) Field of Classification Search
CPC .............. B60L 11/1824; B60L 11/1861; B60L 3/0046; B60L 3/04; Y02T 10/70;
(Continued)

(56) References Cited

U.S. PATENT DOCUMENTS

2009/0085522 A1*  4/2009  Matsumoto ........... B60L 11/182
                                                                          320/137
2010/0120581 A1   5/2010  Mitsutani et al.
(Continued)

FOREIGN PATENT DOCUMENTS

CN   201247967 Y    5/2009
EP   2 556 987 A2   2/2013
(Continued)

OTHER PUBLICATIONS

Combined Search and Examination Report, GB 1307526.2, dated May 29, 2013, 7 pages.
(Continued)

*Primary Examiner* — Mirza Alam
(74) *Attorney, Agent, or Firm* — Myers Bigel, P.A.

(57) ABSTRACT

An apparatus for a vehicle having an electric propulsion motor and energy storage means for powering the motor, the apparatus being operable to generate an audible sonic signature in dependence on a result of a determination whether the vehicle is connected to a charging facility for charging the energy storage means.

19 Claims, 2 Drawing Sheets

(51) Int. Cl.
  *B60L 11/14* (2006.01)
  *H02J 7/00* (2006.01)
  *B60R 25/01* (2013.01)

(52) U.S. Cl.
  CPC ....... *B60L 11/1816* (2013.01); *B60L 11/1861* (2013.01); *B60R 25/01* (2013.01); *H02J 7/0021* (2013.01); *B60L 2210/40* (2013.01); *B60L 2250/10* (2013.01); *Y02T 10/70* (2013.01); *Y02T 10/705* (2013.01); *Y02T 10/7005* (2013.01); *Y02T 10/7044* (2013.01); *Y02T 10/7055* (2013.01); *Y02T 10/7072* (2013.01); *Y02T 10/7077* (2013.01); *Y02T 10/7241* (2013.01); *Y02T 90/121* (2013.01); *Y02T 90/127* (2013.01); *Y02T 90/14* (2013.01)

(58) Field of Classification Search
  CPC ............. Y02T 10/7044; Y02T 10/7055; Y02T 10/7241; Y02T 90/128; Y02T 90/14
  See application file for complete search history.

(56) References Cited

U.S. PATENT DOCUMENTS

| | | | | |
|---|---|---|---|---|
| 2010/0228405 | A1* | 9/2010 | Morgal | B62H 3/02 701/2 |
| 2010/0230193 | A1* | 9/2010 | Grider | B60K 35/00 180/65.27 |
| 2012/0319648 | A1 | 12/2012 | Ohtomo | |
| 2013/0015814 | A1* | 1/2013 | Kelty | B60L 3/0046 320/109 |
| 2013/0204473 | A1* | 8/2013 | Then | B60L 11/1816 701/22 |
| 2014/0371962 | A1* | 12/2014 | Smith | B60L 11/1824 701/22 |

FOREIGN PATENT DOCUMENTS

| | | | |
|---|---|---|---|
| GB | 2 468 560 A | 9/2010 | |
| GB | 2468560 A * | 9/2010 | ............. B60K 35/00 |
| JP | 2001-186672 A | 7/2001 | |
| JP | 2002-017006 A | 1/2002 | |
| JP | 2010-055845 A | 3/2010 | |

OTHER PUBLICATIONS

Notification of Transmittal of the International Search Report and the Written Opinion, PCT/EP2014/058328, dated Nov. 19, 2014, 9 pages.

* cited by examiner

CONTROL SYSTEM, VEHICLE AND METHOD

RELATED APPLICATIONS

This application is a 35 U.S.C. § 371 national stage application of PCT Application No. PCT/EP2014/058328, filed on Apr. 24, 2014, which claims priority from Great Britain Patent Application No. 1307526.2 filed on Apr. 26, 2013, and Great Britain Patent Application No. 1307863.9 filed on May 1, 2013, the contents of which are incorporated herein by reference in their entireties. The above-referenced PCT International Application was published in the English language as International Publication No. WO 2014/174004 A2 on Oct. 30, 2014.

TECHNICAL FIELD

The present invention relates to an apparatus for a motor vehicle, a motor vehicle control system, a vehicle and a method of controlling a vehicle. In particular, but not exclusively, embodiments of the invention relate to apparatus or a control system for a vehicle having an electric propulsion motor powered by charge from an energy storage device that may be recharged when the vehicle is connected to a recharging facility.

BACKGROUND

It is known to provide an electric vehicle and a plug-in hybrid electric vehicle having an electric propulsion motor and a battery for storing charge for powering the motor. The battery may be recharged by connecting the vehicle to a recharging facility.

It is an aim of the present invention to address disadvantages associated with the prior art.

SUMMARY OF THE INVENTION

Embodiments of the invention may be understood with reference to the appended claims.

Aspects of the present invention provide an apparatus, a vehicle and a method.

In one aspect of the invention for which protection is sought there is provided apparatus for a vehicle having an electric propulsion motor and energy storage means for powering the motor, the apparatus being operable to generate an audible sonic signature in dependence on a result of a determination whether the vehicle is connected to a charging facility for charging the energy storage means.

Embodiments of the present invention have the advantage that a user may be informed of the charging connection state of the vehicle. Thus if the user cannot recall or has not been informed whether the vehicle is connected to the charging facility, the user is informed of the connection status by means of an audible sonic signature.

The apparatus may form part of a motor vehicle control system, or be provided substantially separate therefrom. The apparatus may be arranged to communicate with a motor vehicle control system. For example, the apparatus may be arranged to be connected to a controller area network (CAN) bus or other onboard communications network.

The charging facility may be any facility in which means for connecting the vehicle energy storage means to a suitable source of electrical charge is provided.

The apparatus may be operable to determine whether the vehicle is connected to the charging facility in dependence at least in part on whether a charging cable is connected to the vehicle.

This feature has the advantage that where a charging cable is arranged to be connected to the vehicle to facilitate charging, a user may be provided with an audible alert indicating whether or not a charging cable is connected to the vehicle before the user climbs into the vehicle. This provides the user with a reminder to disconnect the cable from the vehicle before climbing into the vehicle. Thus the user can more conveniently manage vehicle charging operations.

Accordingly, in some embodiments the apparatus determines whether the vehicle is connected to a charging facility in dependence at least in part on whether a charging cable is connected to the vehicle.

The apparatus may be operable to determine whether the vehicle is connected to the charging facility in dependence at least in part on whether a vehicle charging cable requires to be stowed before the vehicle may be driven.

This feature has the advantage that if a vehicle is provided with a cable that is arranged to remain attached to the vehicle when driving, the user may be informed as to whether the cable requires to be stowed before the vehicle may be driven. By the term stowed is meant that the cable is required to be placed in a condition suitable for driving before the vehicle may be driven. Thus, the cable is not in a position suitable for driving if it requires to be stowed before the vehicle may be driven.

Accordingly, in such embodiments, the determination whether the vehicle is connected to a charging station may be made at least in part in dependence on whether the charging cable is in a stowed condition.

The apparatus may be operable to determine whether the vehicle is connected to the charging facility in dependence at least in part on whether a cable access port is in an open or closed condition.

For example, in the case of a vehicle having a cable that is arranged to remain connected to the vehicle when driving, the sonic signature may be generated in dependence on a state of a port or other opening through which the cable may be withdrawn from the vehicle for connection to a charging station. The apparatus may therefore be arranged to determine whether the vehicle is connected to a charging facility at least in part in dependence on whether the port is open or closed. A closure member such as a door, hatch or like feature may be provide by means of which the port may assume an open or closed condition.

The cable may for example be a retractable cable.

In the case of a vehicle to which a cable is connected for charging and removed before driving, the opening may be provided for allowing connection of the cable to the vehicle. Thus, the apparatus may be arranged to determine whether the vehicle is connected to a charging facility at least in part in dependence on a state of the opening (whether open or closed).

The apparatus may be operable to generate the sonic signature upon detecting the presence of a portable user identification device.

The portable user identification device may for example be a key, a key fob or other starter device or starting means.

The apparatus may be operable to generate the sonic signature in response to a determination that a user wishes to unlock the vehicle.

The apparatus may be operable to generate the sonic signature in response to a signal received from the portable user identification device.

Thus, if the user signals, for example by means of the portable user identification device, that they wish to unlock the vehicle the apparatus may generate the sonic signature. The apparatus may also unlock the vehicle. Alternatively a different vehicle system may unlock the vehicle. It is to be understood that the apparatus may form part of a vehicle locking system, for example it may be integrated therewith. Alternatively, the apparatus may monitor signals transmitted by a vehicle locking system, for example signals broadcast on a controller area network (CAN) bus and generate the sonic signature when a signal is present indicating that a user has requested unlocking of the vehicle, or that the doors of the vehicle are to be unlocked in response to a user request.

In some embodiments the apparatus may recognise that the user wishes to unlock the vehicle when a particular one or more user identification devices are recognised by the apparatus or another control system. In some embodiments, the apparatus may recognise that the user wishes to unlock the vehicle when a particular one or more user identification devices are recognised and at the same time the apparatus or another vehicle system detects that a user is sufficiently close to door opening means such as handle means. The handle means may be retractable handle means, the apparatus or other control system being operable to deploy the handle means to allow the user to open a door of the vehicle when the user's hand is sufficiently close to the handle means and an authorised user identification device is determined to be present. By authorised device is meant a device corresponding to an authorised user of that particular vehicle, for example a device programmed with a unique identification codes such as the vehicle identification number (VIN).

The apparatus may be operable to generate the audible sonic signature whereby the signature may be heard from outside the vehicle.

The apparatus may be operable to generate the audible sonic signature by means of audio transducer means external to a cabin of the vehicle.

The apparatus may be operable to generate the audible sonic signature whereby the signature may be heard from inside the vehicle.

The apparatus may be operable to generate the audible sonic signature by means of audio transducer means internal to the cabin of the vehicle.

The apparatus may be operable to generate one of a plurality of respective audible sonic signatures when it is determined that vehicle is connected to the charging facility, an identity of the sonic signature generated being selected in dependence on a state of charge of the energy storage means.

The apparatus may be operable to generate a first connected state sonic signature when it is determined that vehicle is connected to the charging facility and the energy storage means has reached a prescribed state of charge.

The apparatus may be arranged wherein the prescribed state of charge corresponds to a substantially full state of charge.

The prescribed state of charge may correspond to a user-prescribed amount of charge.

The apparatus may be operable to generate a second connected state sonic signature when it is determined that vehicle is connected to the charging facility if the energy storage means has a state of charge that is less than the prescribed state of charge.

Embodiments of the present invention have the advantage that a user may be informed of the battery state of charge whilst the vehicle is connected to the charging facility.

The apparatus may be operable to generate a prescribed sonic signature if it is determined that the vehicle is not connected to a charging facility, the prescribed sonic signature being different from that generated when it is determined that the vehicle is connected to a charging facility.

The apparatus may be operable to generate one of a plurality of respective sonic signatures if it is determined that the vehicle is not connected to a charging facility in dependence on a state of charge of the energy storage means.

The apparatus may be operable to generate a first disconnected state sonic signature if the state of charge of the energy storage means is greater than or substantially equal to a prescribed state of charge.

The prescribed state of charge may correspond to a substantially full state of charge.

The prescribed state of charge may correspond to a user-prescribed amount of charge.

The apparatus may be operable to generate a second disconnected state sonic signature if a state of charge of the energy storage means is less than a prescribed state of charge.

In a further aspect of the invention for which protection is sought there is provided a motor vehicle system comprising apparatus according to a preceding aspect.

In a still further aspect of the invention for which protection is sought there is provided a motor vehicle comprising apparatus or a system according to a preceding aspect.

The vehicle may be an electric vehicle.

Alternatively the vehicle may be a hybrid electric vehicle.

In one aspect of the invention for which protection is sought there is provided a method of providing feedback to a user of a motor vehicle having an electric propulsion motor and energy storage means for powering the motor, the method comprising generating an audible sonic signature in dependence on whether the vehicle is connected to a charging facility for charging the energy storage means.

The method may comprise generating one of a plurality of respective audible sonic signatures when the vehicle is connected to a charging facility, an identity of the sonic signature generated being selected in dependence on a state of charge of the energy storage means.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying figures in which.

DETAILED DESCRIPTION

Figure 1:
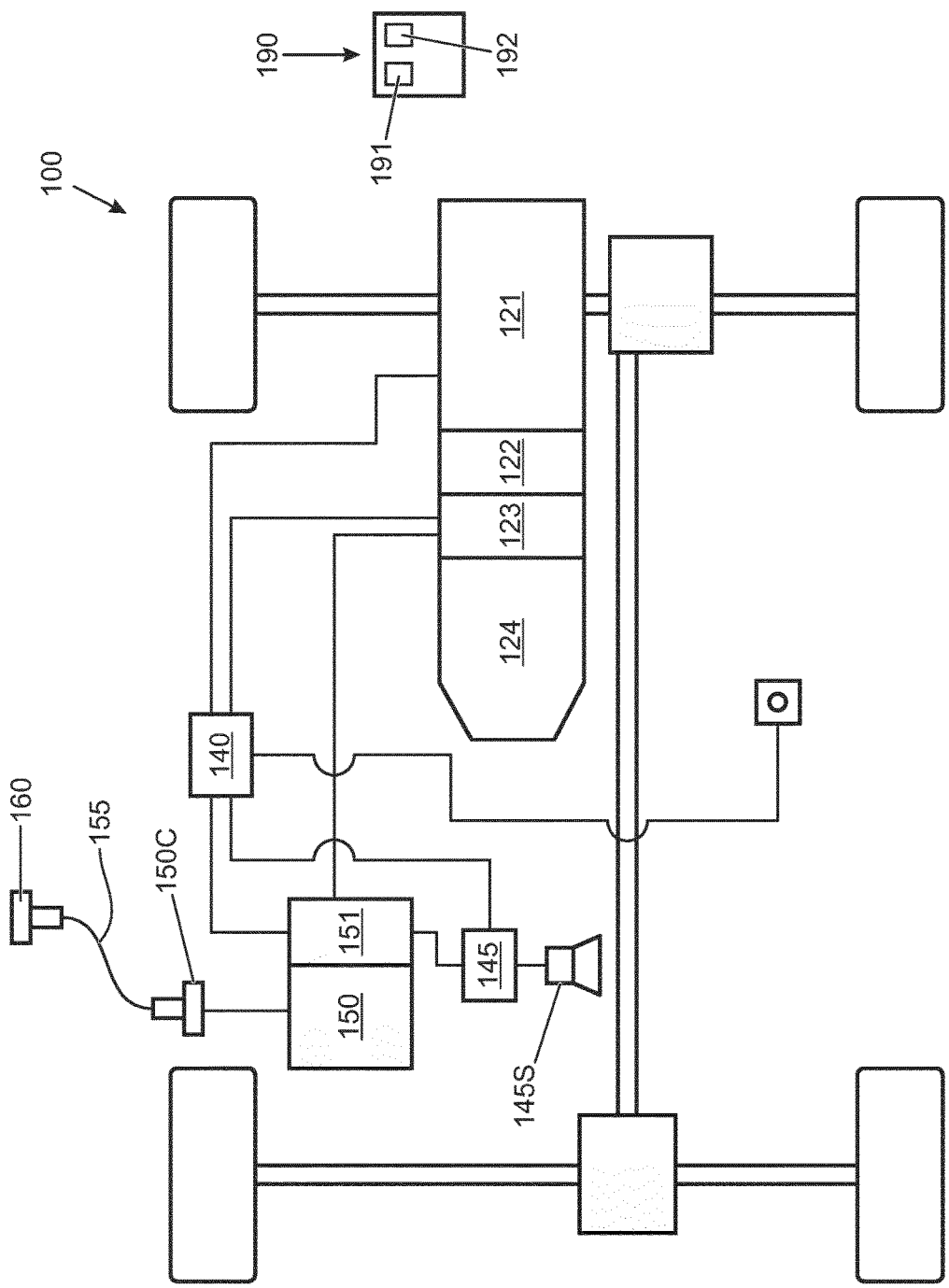
FIG. 1 is a schematic illustration of a hybrid electric vehicle according to an embodiment of the present invention.

FIG. 1 shows a hybrid electric vehicle (HEV) 100 according to an embodiment of the present invention. The vehicle 100 has an internal combustion engine 121 releasably coupled to a crankshaft integrated motor/generator (CIMG) 123 by means of a clutch 122. The CIMG 123 is in turn coupled to an automatic transmission 124. The vehicle 100 is operable to provide drive torque to the transmission 124 by means of the engine 121 alone, the CIMG 123 alone or the engine 121 and CIMG 123 in parallel.

It is to be understood that in some embodiments the transmission 124 may be a manual transmission instead of an automatic transmission The vehicle 100 has a battery 150 connected to an inverter 151 that generates a three-phase electrical supply that is supplied to the CIMG 123 when the CIMG 123 is operated as a motor. The battery 150 is arranged to receive charge from the CIMG 123 when the CIMG 123 is operated as a generator.

The battery 150 is also connected to a charging port 150C that is accessible from an exterior of the vehicle 100. The charging port 150C allows the battery 150 to be connected to a charging station 160 by means of a charging cable 155 to allow recharging of the battery 150. The vehicle 100 may therefore be described as a HEV of 'plug-in' type.

The vehicle 100 has a controller 140 configured to control operation of the vehicle 100 in an EV mode or hybrid mode.

When it is required to charge the battery 150 of the vehicle 100, the battery 150 may be connected to a charging station 160 by connecting a charging port 150C of the vehicle 100 to a charging cable 155 which is in turn connected to the charging station 160.

The vehicle 100 has a vehicle control unit (VCU) 145 operable to place the vehicle in one of a plurality of power modes. The power modes include a parked mode (power mode 1, or 'PM1') in which the controller 140 is prevented from allowing the engine 121 or CIMG 123 to be operated. The parked mode may be assumed only when the transmission is placed in the park mode.

If a user exits the vehicle 100 and locks the vehicle, the VCU 145 is operable to place the vehicle in a 'parked and locked' condition in which vehicle systems are placed in a low power consumption mode. This mode is referred to as 'power mode 0' or PM0.

The VCU 145 is configured to check that each of four doors and each of two rear payload doors (not shown) are closed before allowing the vehicle to assume mode PM0. Other checks may also be made before mode PM0, for example that one or more controllers such as controller 140 have shut down.

A user may place the vehicle 100 in PM0 by means of a key fob 190. The fob 190 has first and second control buttons 191, 192. The first control button 191 is operable to unlock the vehicle 100 whilst the second control button 192 is operable to lock the vehicle 100.

With the vehicle in mode PM0, if the VCU 145 detects that a user has pressed the first control button 191 of the fob 190, the VCU 145 is configured to control the vehicle 100 to assume power mode PM1 and unlocks the vehicle 100. The VCU 145 checks whether a charging cable 155 is connected to the charging port 150C. If a charging cable 155 is not connected the VCU 145 generates an audible 'cable disconnected' sonic signature (sonic signature A) by means of an audio transducer in the form of an audio speaker 145S, informing the user that the charging port 150C is not connected to a charging cable 155. The sonic signature is stored in a memory of the VCU 145 as a .wav file although other formats are also useful. Other forms of audio transducer are also useful.

In the present embodiment the audio transducer is in the form of a dynamic loudspeaker having a cone-shaped diaphragm and electromagnetic coil driver. Other forms of audio transducer such as contact transducers and bending wave radiators are also useful. Other audio transducers are also useful.

If a charging cable 155 is connected to the charging port 150C, the VCU 145 generates a different audible sonic signature. The sonic signature generated depends on whether or not the battery 150 is fully charged. If the battery 150 is fully charged the VCU 145 generates an audible 'cable connected battery fully charged' sonic signature (sonic signature B). If the battery is not fully charged the VCU 145 generates an audible 'cable connected vehicle charging' sonic signature (sonic signature C) different from sonic signatures A and B. Other arrangements are also useful.

In an embodiment, if the charging cable 155 is connected to the charging port 150C and the battery 150 is not fully charged but the battery 150 is no longer being charged, the VCU 145 may generate a further sonic signature indicating 'cable connected battery not fully charged battery not charging' sonic signature. Other arrangements are also useful.

In some embodiments, the VCU 145 may be operable to provide an audible indication of a state of charge of the battery 150 regardless of whether a charging cable 150 is connected to the vehicle 100. Thus, in some embodiments the VCU 145 may generate a 'cable not connected battery not fully charged' audible sonic signature or a 'cable not connected battery fully charged' audible sonic signature depending on whether or not the battery is fully charged when the charging cable 155 is not connected. Other arrangements are also useful.

It is to be understood that embodiments of the invention are also suitable for implementation when a vehicle 100 is in power mode PM1, as well as when a vehicle 100 is in mode PM0. Thus, if a user parks the vehicle but does not lock the vehicle, and the vehicle remains in mode PM1, the VCU 145 may still be operable to generate an audible sonic signature as described above if a user returns to the vehicle 100 and presses the first control button 191 to unlock the vehicle. In some embodiments, a user may trigger the generation of a sonic signature by other means in addition or instead. In some embodiments, a separate 'charging status' control button or the like may be provided. Other arrangements are also useful for generating an audible sonic signature to check charging status, such as simultaneous depression of more than one button 191, 192.

Figure 2:
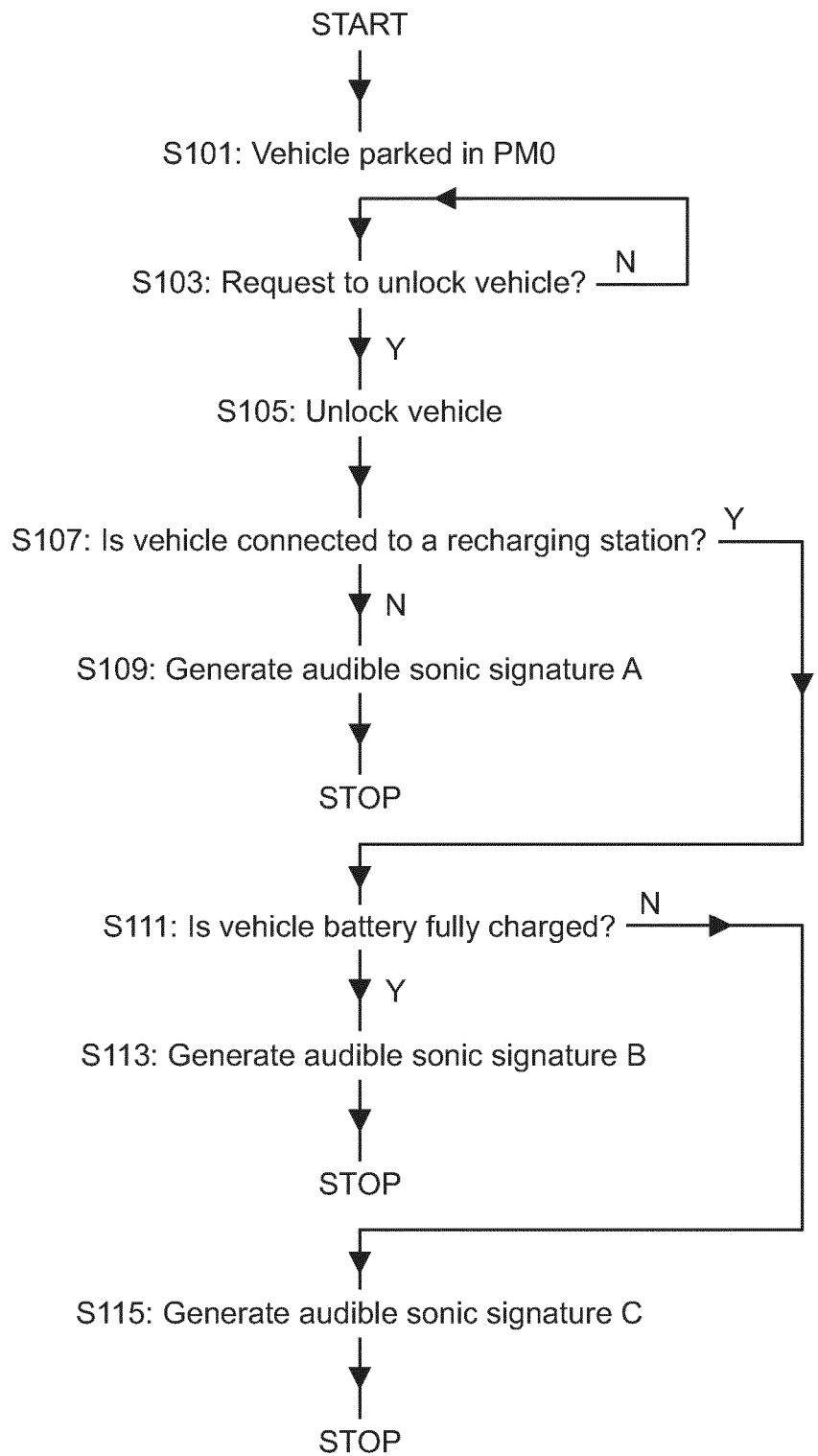
FIG. 2 is a flow chart illustrating a method according to an embodiment of the present invention.

FIG. 2 illustrates a method according to an embodiment of the present invention implemented by the VCU 145.

At step S101 the vehicle 100 is parked in power mode PM0, i.e. in a locked condition.

At step S103 the VCU 145 checks whether a request has been received to unlock the vehicle 100 via fob 190. If a request has not been received, the VCU 145 continues at step S103.

If a request is received the VCU 145 continues to step S105. At step S105 the VCU 145 unlocks the vehicle 100 and continues at step S107.

At step S107 the VCU 145 interrogates the inverter 151 to determine whether the charging port 150C is connected to a charging station 160. If the charging port 150C is not connected to a charging station 160 then at step S109 the VCU 145 generates audible sonic signature A, being the 'cable disconnected' sonic signature by means of a speaker 145S.

If at step S107 the VCU 145 determines that the charging port 150C is connected to a charging station 160, the VCU 145 continues at step S111. At step S111 the VCU 145 determines whether the battery 150 is fully charged by reference to a signal generated by the inverter 151. If the battery 150 is fully charged, the VCU 145 continues at step S113. At step S113 the VCU 145 generates an audible sonic signature B, being the 'cable connected battery fully charged' sonic signature.

If at step S111 the VCU 145 determines that the battery 150 is not fully charged the VCU 145 continues at step S115. At step S115 the VCU 145 generates an audible sonic signature C, being the 'cable connected vehicle charging' sonic signature.

Embodiments of the present invention have the advantage that a user may be made aware of a charging condition of a vehicle 100 before the user enters the vehicle 100. Thus if the user does not know whether the vehicle 100 is connected to a charging station 160, the user may tell, from the audible sonic signature generated when the vehicle 100 is unlocked, whether the vehicle 100 is so connected. Thus, the user does not have to perform a visual inspection of the charging port 150C to determine whether a cable 155 is connected thereto.

Furthermore, in the case the vehicle 100 is connected to a charging station 160, the user may determine whether the vehicle 100 is fully charged, or whether the vehicle 100 is still charging, by reference to the audible sonic signature. Thus, a user wishing to know whether the battery 150 is fully charged as he or she approaches the vehicle 100 is not required to enter the vehicle 100 and check the state of charge of the battery 150 by reference to an instrument panel of the vehicle 100.

Embodiments of the present invention may be understood by reference to the following numbered paragraphs:

1. An apparatus for a vehicle having an electric propulsion motor and an energy storage device for powering the motor, the apparatus being operable to generate an audible sonic signature in dependence on a result of a determination whether the vehicle is connected to a charging facility for charging the energy storage device.

2. An apparatus according to paragraph 1 operable to determine whether the vehicle is connected to the charging facility in dependence at least in part on whether a charging cable is connected to the vehicle.

3. An apparatus according to paragraph 1 operable to determine whether the vehicle is connected to the charging facility in dependence at least in part on whether a vehicle charging cable requires to be stowed before the vehicle may be driven.

4. An apparatus according to paragraph 1 operable to determine whether the vehicle is connected to the charging facility in dependence at least in part on whether a cable access port is in an open or closed condition.

5. An apparatus according to paragraph 1 operable to generate the sonic signature upon detecting the presence of a portable user identification device.

6. An apparatus according to paragraph 1 operable to generate the sonic signature in response to a determination that a user wishes to unlock the vehicle.

7. An apparatus according to paragraph 5 operable to generate the sonic signature in response to a signal received from the portable user identification device.

8. An apparatus according to paragraph 1 operable to generate the audible sonic signature whereby the signature may be heard from outside the vehicle.

9. An apparatus according to paragraph 1 operable to generate the audible sonic signature by means of an audio transducer external to a cabin of the vehicle.

10. An apparatus according to paragraph 1 operable to generate the audible sonic signature whereby the signature may be heard from inside the vehicle.

11. An apparatus according to paragraph 1 operable to generate the audible sonic signature by means of an audio transducer internal to the cabin of the vehicle.

12. An apparatus according to paragraph 1 operable to generate one of a plurality of respective audible sonic signatures when it is determined that vehicle is connected to the charging facility, an identity of the sonic signature generated being selected in dependence on a state of charge of the energy storage device.

13. An apparatus according to paragraph 12 operable to generate a first connected state sonic signature when it is determined that vehicle is connected to the charging facility and the energy storage device has reached a prescribed state of charge.

14. An apparatus according to paragraph 13 wherein the prescribed state of charge corresponds to a substantially full state of charge.

15. An apparatus according to paragraph 13 wherein the prescribed state of charge corresponds to a user-prescribed amount of charge.

16. An apparatus according to paragraph 12 operable to generate a second connected state sonic signature when it is determined that vehicle is connected to the charging facility if the energy storage device has a state of charge that is less than the prescribed state of charge.

17. An apparatus according to paragraph 1 operable to generate a prescribed sonic signature if it is determined that the vehicle is not connected to a charging facility, the prescribed sonic signature being different from that generated when it is determined that the vehicle is connected to a charging facility.

18. An apparatus according to paragraph 17 operable to generate one of a plurality of respective sonic signatures if it is determined that the vehicle is not connected to a charging facility in dependence on a state of charge of the energy storage device.

19. An apparatus according to paragraph 18 operable to generate a first disconnected state sonic signature if the state of charge of the energy storage device is greater than or substantially equal to a prescribed state of charge.

20. An apparatus according to paragraph 19 wherein the prescribed state of charge corresponds to a substantially full state of charge.

21. An apparatus according to paragraph 19 wherein the prescribed state of charge corresponds to a user-prescribed amount of charge.

22. An apparatus according to paragraph 17 operable to generate a second disconnected state sonic signature if a state of charge of the energy storage device is less than a prescribed state of charge.

23. A motor vehicle system comprising apparatus according to paragraph 1.

24. A motor vehicle comprising apparatus according to paragraph 1 or a system according to paragraph 23.

25. A vehicle according to paragraph 24 wherein the vehicle is an electric vehicle.

26. A vehicle according to paragraph 24 wherein the vehicle is a hybrid electric vehicle.

27. A method of providing feedback to a user of a motor vehicle having an electric propulsion motor and an energy storage device for powering the motor, the method comprising generating an audible sonic signature in dependence on whether the vehicle is connected to a charging facility for charging the energy storage device.

28. A method according to paragraph 27 further comprising generating one of a plurality of respective audible sonic signatures when the vehicle is connected to a charging facility, an identity of the sonic signature generated being selected in dependence on a state of charge of the energy storage device.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An apparatus for a vehicle having an electric propulsion motor and at least one battery configured to power the electric propulsion motor, the apparatus configured to:
   detect a signal from a portable user identification device to unlock the vehicle;
   after detecting the signal, determine whether the vehicle is connected to a charging facility for charging the at least one battery; and
   in response to detecting the signal from the portable user identification device to unlock the vehicle:
      generate an audible sonic signature in response to determining that the vehicle is connected to the charging facility, and
      generate a second connected state audible sonic signature when the result of the determination is that the vehicle is connected to the charging facility if the at least one battery has a state of charge that is less than a prescribed state of charge.

2. The apparatus according to claim 1, wherein the apparatus is configured to determine whether the vehicle is connected to the charging facility in dependence at least in part on whether a charging cable is connected to the vehicle.

3. The apparatus according to claim 1, wherein the apparatus is configured to determine whether the vehicle is connected to the charging facility in dependence at least in part on whether a vehicle charging cable is required to be stowed before the vehicle may be driven.

4. The apparatus according to claim 1, wherein the apparatus is configured to generate one of a plurality of respective audible sonic signatures comprising the second connected state audible sonic signature when the result of the determination is that the vehicle is connected to the charging facility, an identity of the audible sonic signature generated in response to the signal being selected in dependence on a state of charge of the at least one battery.

5. The apparatus according to claim 4, wherein the audible sonic signature has a first identity if the state of charge is at or above a prescribed state of charge, and has a second different identity if the state of charge is below the prescribed state of charge.

6. The apparatus according to claim 5, wherein the prescribed state of charge corresponds to a full state of charge or to a user-prescribed amount of charge.

7. The apparatus according to claim 4, wherein the apparatus is configured to generate one of a plurality of respective audible sonic signatures in response to the signal if the result of the determination is that the vehicle is not connected to the charging facility in dependence on a state of charge of the at least one battery.

8. The apparatus according to claim 7, wherein the apparatus is configured to generate a first disconnected state audible sonic signature in response to the signal if the state of charge of the at least one battery is greater than or equal to a prescribed state of charge.

9. The apparatus according to claim 8, wherein the prescribed state of charge corresponds to a full state of charge or to a user-prescribed amount of charge.

10. The apparatus according to claim 7, wherein the apparatus is configured to generate a second disconnected state audible sonic signature in response to the signal if a state of charge of the at least one battery is less than a prescribed state of charge.

11. A motor vehicle comprising the apparatus according to claim 1.

12. The vehicle according to claim 11 wherein the vehicle is an electric vehicle or a hybrid electric vehicle.

13. A method of providing feedback to a user of a motor vehicle having an electric propulsion motor and at least one battery configured to power the electric propulsion motor, the method comprising:
   detecting a signal from a portable user identification device to unlock the vehicle;
   after detecting the signal, determining whether the vehicle is connected to a charging facility for charging the at least one battery; and
   in response to detecting the signal from the portable user identification device to unlock the vehicle, generating an audible sonic signature in response to determining that the vehicle is connected to the charging facility, and generating a second connected state audible sonic signature when the result of the determination is that the vehicle is connected to the charging facility if the at least one battery has a state of charge that is less than a prescribed state of charge.

14. The method according to claim 13, further comprising generating one of a plurality of respective audible sonic signatures comprising the second connected state audible sonic signature when the result of the determination is that the vehicle is connected to the charging facility, an identity of the audible sonic signature generated being selected in dependence on a state of charge of the at least one battery.

15. The apparatus according to claim 1, wherein the portable user identification device comprises a key or a key fob.

16. An apparatus for a vehicle having an electric propulsion motor and at least one battery configured to power the electric propulsion motor, the apparatus configured to:
   at a first time, perform a first determination of whether a request has been received to unlock the vehicle, the request comprising a signal from a portable user identification device to unlock the vehicle;
   at a second time after the first time, perform a second determination to determine whether the vehicle is connected to a charging facility for charging the at least one battery;
   at a third time after the second time, generate an audible sonic signature if both a request to unlock the vehicle has been received and the vehicle is connected to the charging facility, while the vehicle continues to be at least one of connected to the charging facility or connected to the charging facility and charging, at least between the first time and the third time; and at the third time, generate a second connected state audible sonic signature if both a request to unlock the vehicle has been received and the vehicle is connected to the charging facility and if the at least one battery has a state of charge that is less than a prescribed state of charge, wherein the audible sonic signature is not generated if a request to unlock the vehicle has not been received regardless of whether the vehicle is connected or disconnected from the charging facility, and wherein the audible sonic signature is not generated if the vehicle is not connected to the charging facility even if a request to unlock the vehicle has been received.

17. The apparatus according to claim 16, further configured to:

generate a disconnected state audible sonic signature different from the audible sonic signature, if a request to unlock the vehicle has been received and the vehicle is not connected to the charging facility.

18. The apparatus according to claim 16, wherein the second connected state audible sonic signature is generated if a request to unlock the vehicle has been received and the vehicle is connected to the charging facility, while the vehicle continues to be connected to the charging facility and charging at least between the first time and the third time.

19. The apparatus according to claim 18, wherein:

if a state of charge of the at least one battery has not reached a prescribed state of charge by the third time, the vehicle continues to be connected to the charging facility and charging beyond the third time and until the prescribed state of charge is reached, and if the state of charge has reached the prescribed state of charge by the third time, the charging does not occur beyond the third time.

\* \* \* \* \*